United States Patent [19]

Pien

[11] 4,017,819
[45] Apr. 12, 1977

[54] PRESSURE TRANSDUCER

[75] Inventor: Hsia-Si Pien, New Fairfield, Conn.

[73] Assignee: Consolidated Controls Corporation, Bethel, Conn.

[22] Filed: Jan. 13, 1975

[21] Appl. No.: 540,510

[52] U.S. Cl. .............................. 338/4; 73/141 A; 338/36
[51] Int. Cl.[2] ......................................... G01L 1/22
[58] Field of Search .......... 338/4, 5, 36; 73/141 A, 73/141 R

[56] References Cited

UNITED STATES PATENTS

| | | | |
|---|---|---|---|
| 3,168,718 | 2/1965 | Swartz et al. | 338/4 X |
| 3,272,006 | 9/1966 | Eckard | 73/141 A |
| 3,303,451 | 2/1967 | Yuan | 338/4 |
| 3,335,381 | 8/1967 | Giovanni | 338/4 |

*Primary Examiner*—C. L. Albritton
*Attorney, Agent, or Firm*—Mason, Kolehmainen, Rathburn & Wyss

[57] ABSTRACT

A force measuring beam assembly for use in pressure transducers, accelerometers, load cells, or the like, is symmetrically and floatingly mounted by means of a pair of thin torsionally flexed elements which are positioned in planes perpendicular to the plane of the beam and connect diametrically opposed corners of the beam to a rigid supporting base member in such manner that the beam may be deflected in proportion to movement of the center of the beam and provide an extremely accurate and linear output signal by means of strain gauge elements secured to the beam.

In one embodiment a transducer for measuring fluid pressure over a wide range of values includes a diaphragm which is concentric with the force measuring beam assembly. A rigid connection is provided between the center of the diaphragm and the center of the beam so that non-linearity effects are avoided.

Preferably, the flexure support elements may be formed by electron discharge milling so that extremely thin torsionally flexible support elements are provided at each end of the beam. Non-linearity producing stresses in the connection between beam and diaphragm are avoided by first connecting the center portion of the diaphragm to a central transversely extending portion of the beam, then securing the bottom edge of the outer rim of the diaphragm to the main pressure fitting of the transducer while permitting the outer rim of the beam assembly to float with respect to the rim of the diaphragm, and then finally securing the outer rim of the beam assembly to the rim of the diaphragm.

8 Claims, 8 Drawing Figures

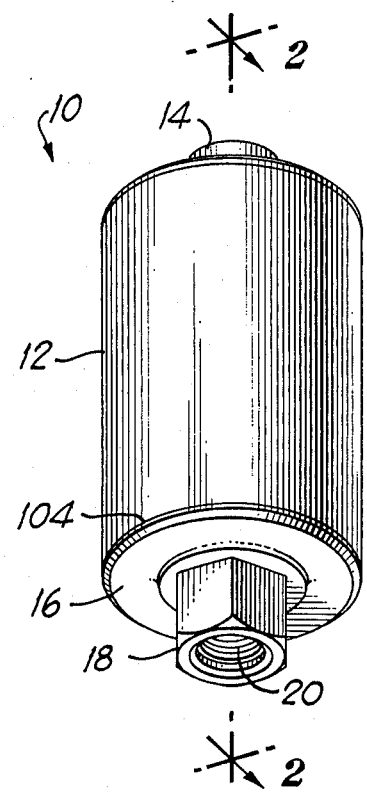
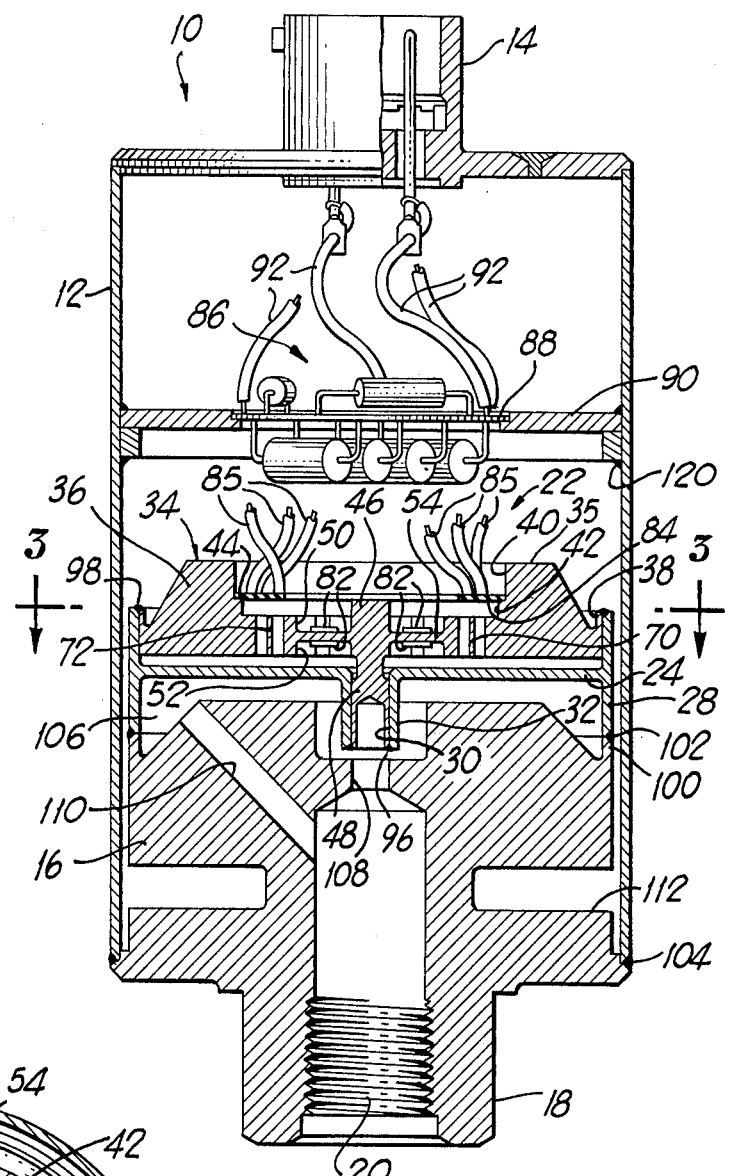
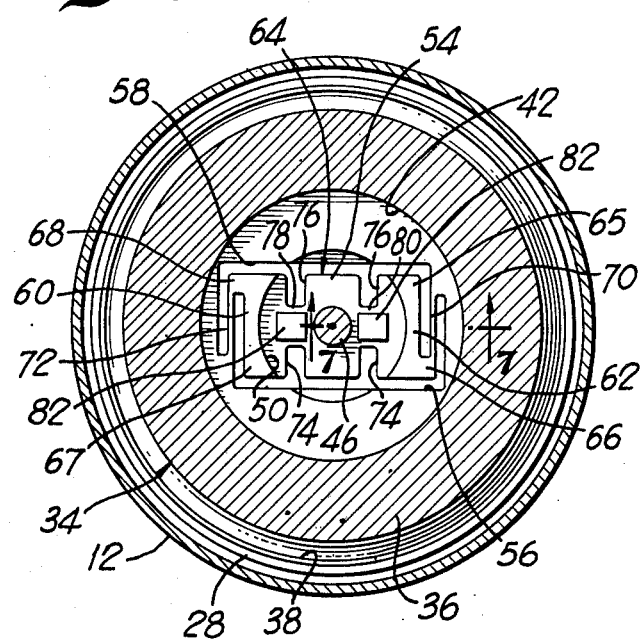
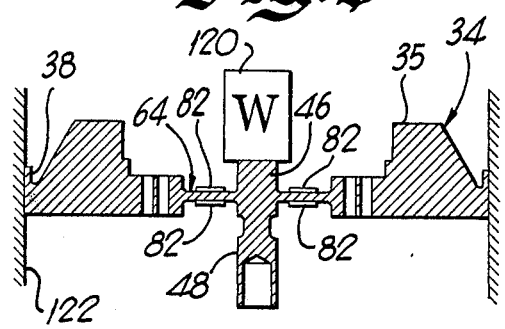

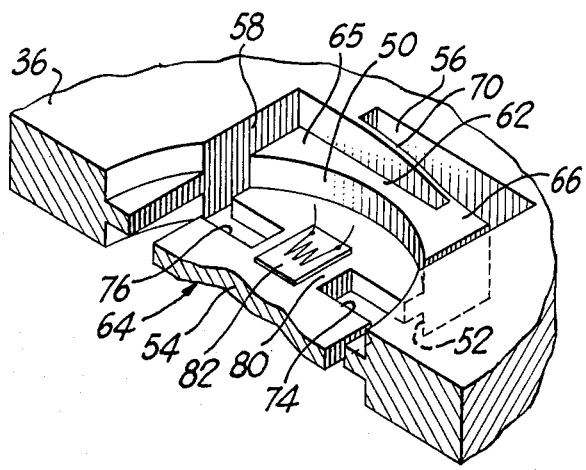
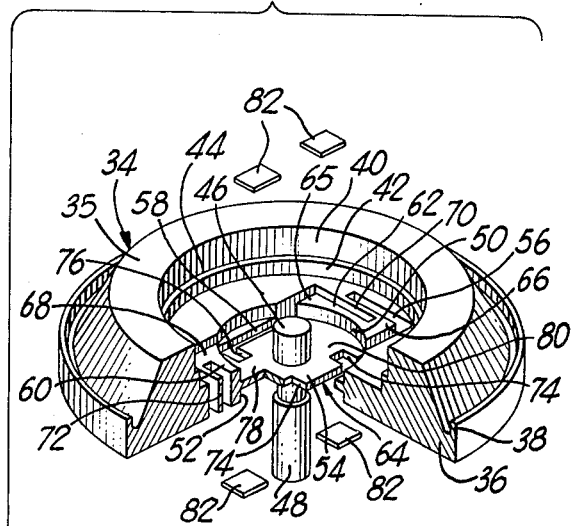
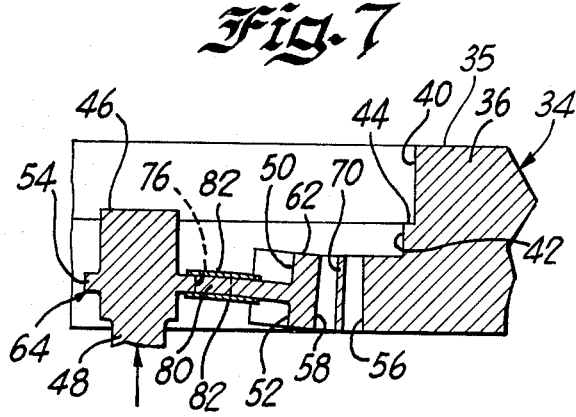
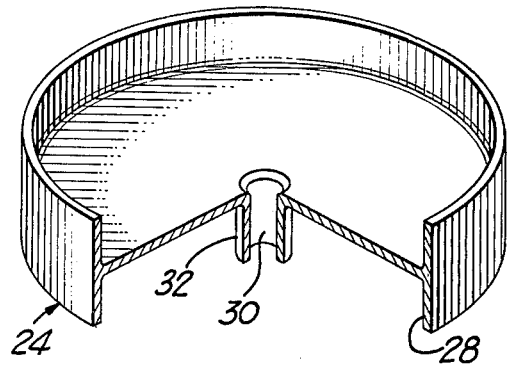
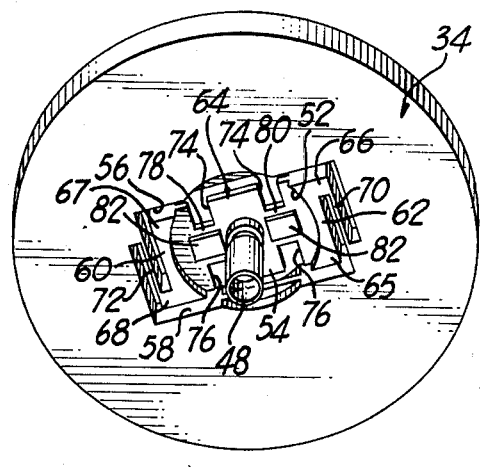
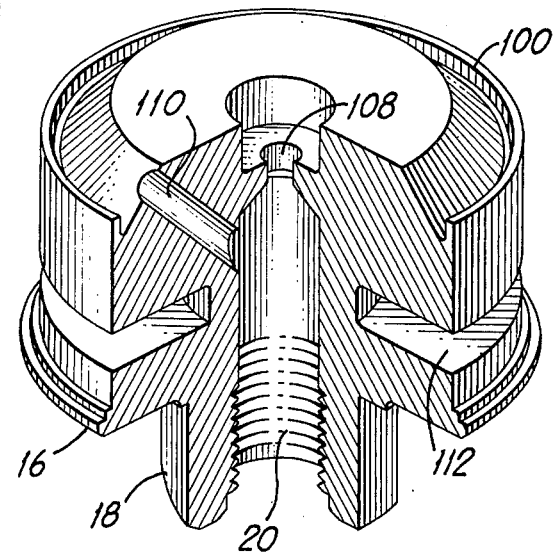

PRESSURE TRANSDUCER

BACKGROUND OF THE INVENTION

A. Field of the Invention

The device of the present invention generally relates to the field of strain gauge pressure transducers and, more particularly, to a new and improved mounting arrangement for the pressure-sensing beam element of the transducer which permits the beam to follow movement of the diaphragm very accurately and without introducing distortions or internal stresses which normally interfere with the accurate measurement of such movement.

B. Description of the Prior Art

In the measurement of pressure, one of the more efficient and effective methods is the utilization of strain gauges and electric current. Many strain gauge pressure transducers have utilized the movement of a pressure sensitive diaphragm which is connected to a pressure-sensing beam by means of a mechanical linkage. Strain gauges positioned on opposite sides of the beam are employed to develop a suitable output signal. These arrangements have generally suffered from a so-called non-linearity effects in which the stresses set up in the mechanical linkage prevent the exact output signal from being repeatably produced as input pressure is moved up and down, similar to the well known hysteresis effect in magnetic circuits. One such arrangement is shown in U.S. Pat. No. 3,303,451 wherein a double-cantilever beam arrangement is provided which is mechanically connected to the center of a very small diaphragm. However, this double-cantilever beam and mounting arrangement introduces nonlinearities due to so-called membrane forces which prevent the output signal from being linearly proportional to strain at relatively high strain levels.

Certain prior art pressure transducers have employed an integral beam-diaphragm arrangement so that movement of the diaphragm is accurately imparted to the beam element and the above-described non-linearity effects are minimized. Examples of such integral beam-diaphragm transducers are shown in U.S. Pat. Nos. 2,979,680; 3,035,240; and 3,520,191. While these arrangements are generally suitable for their intended purpose, the integral beam and diaphragm in these transducers inherently limits the pressure range which can be covered.

SUMMARY OF THE INVENTION

An object of the present invention is to provide a new and improved beam mounting arrangement for use in a pressure transducer of the strain gauge type.

Another object of the present invention is to provide a new and improved method of fabricating a device displaying a high degree of accuracy in measuring pressurized fluid.

Similarly, an object of the present invention is to provide a new and improved method for assembling a device for measuring fluid pressure that results in an essentially strain-free diaphragm type pressure transducer.

A further object of the present invention is to provide a new and improved device for measuring fluid pressure that is easily cleaned.

Briefly, the present invention is directed to a pressure transducer which includes a housing having a fluid inlet adjacent a chamber defined by the inlet and a pressure sensitive diaphragm also positioned within the housing. A separate beam type measuring element is provided concentric with the diaphragm and a rigid connection is provided between a relatively massive central stem portion of the beam and a central sleeve portion of the diaphragm.

The beam is symmetrically and floatingly mounted by means of a pair of thin torsionally flexible elements which are positioned on edge, i.e. in planes perpendicular to the plane of the diaphragm and beam and connect the opposite ends of the beam to a rigid supporting base member in such manner that the beam may be deflected in proportion to movement of the center of the diaphragm and provides an extremely accurate and linear output signal by means of strain gauge elements secured to the beam. Preferably, the flexure support elements are formed by electron discharge milling so that extremely thin torsionally flexible support elements are provided at each end of the beam. Nonlinearity producing stresses in the connection between beam and diaphragm are avoided by first connecting the center portion of the diaphragm to a central transversely extending portion of the beam, then securing the outer rim of the diaphragm to the main pressure fitting of the transducer while permitting the rim of the beam assembly to float with respect to the rim of the diaphragm, and then finally securing the rim of the beam assembly to the rim of the diaphragm.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is a lower-perspective view of a preferred embodiment of a pressure transducer constructed in accordance with the principles of the present invention;

FIG. 2 is an enlarged, cross sectional view of the device of the present invention taken along line 2—2 of FIG. 1;

FIG. 3 is an enlarged, cross sectional view of the device of the present invention taken along line 3—3 of FIG. 2;

FIG. 4 is an exploded, partially cross sectional view of the present invention illustrated in FIG. 3;

FIG. 5 is a lower-perspective view of the pressure sensing beam structure of FIG. 4;

FIG. 6 is an enlarged, lower-perspective view of the beam mounting arrangement of FIG. 5 and illustrating the manner in which the flexure mounting elements are twisted when force is applied to the beam;

FIG. 7 is a fragmentary sectional view taken along the line 7—7 of FIG. 3 and illustrating displacement of the beam by the diaphragm; and FIG. 8 is a sectional side elevational view of an alternative embodiment of the invention showing the beam structure employed in an accelerometer or load cell arrangement.

DESCRIPTION OF THE PREFERRED EMBODIMENT

With reference to FIGS. 1–7 of the drawings, there is illustrated a new and improved pressure transducer 10 constructed in accordance with the principles of the present invention. The pressure transducer 10 may be connected to a fluid supply to measure existing dynamic or static fluid pressures. The transducer 10 includes a housing 12 having at its upper end a receptacle 14 for connection to leads that extend to measuring equipment (not shown) of a type well known in the art. At the lower end of the housing 12 there is mounted a main fitting or base member 16 having a threaded inlet port 18. The threads 20 of inlet port 18 allow the transducer 10 to be connected to a suitable fluid supply.

Also positioned within the housing 12 and above the fitting 16 is a diaphragm and beam assembly indicated generally at 22, and consisting of a diaphragm 24 mounted upon and extending above the fitting 16, and a floating beam structure indicated generally at 34, which is mounted on the diaphragm 24. More particularly, the diaphragm 24 is provided with an integral upstanding rim portion 28 (FIG. 4) and includes a centrally disposed aperture 30 partially defined by a downturned integral sleeve 32. The floating beam structure 34 includes a relatively massive annular support portion 36 having a rim portion 38 which fits into the rim portion 28 of the diaphragm 24 and may be secured thereto by welding or the like after the parts have been assembled, as will be described in more detail hereinafter.

In accordance with an important feature of the present invention, a beam pressure sensing element is formed integrally with and is floatingly connected to the annular support portion 36 of the structure 34. More particularly, the portion 36 is first milled out to provide a central opening 40 and a second annular opening 42 of smaller diameter is then milled out to provide an outer shoulder 44 while retaining a relatively massive central stem portion 46 projecting upwardly at the center of the opening 42. The other side of the blank is also milled to provide a downwardly projecting central stem portion 48 which is arranged to fit within the central sleeve 32 of the diaphragm 24. The blank is then milled out on both sides to form annular openings 50 and 52 of smaller diameter which define a relatively thin central portion 54. The blank is then heat treated to harden it and two transversely extending slots 56 and 58 are milled through the central portion and the thicker outer portions 60 and 62 (FIG. 3) to define a beam element 64 which is supported at the diametrically opposed corners 66 and 68 thereof by thin, torsionally flexible mounting elements 70 and 72. The slots 56 and 58 include inwardly extending notch portions 74 and 76, respectively, which define stress concentrating portions 78 and 80 in the beam 64. In these areas 78, 80 the strain gauge elements 82 may be mounted on both sides of the beam 64. The relatively fine wires of these strain gauges may be connected to a terminal board 84 which is seated on the shoulder 44 and carries the heavier wires 85 which connect the strain guages to suitable electronic circuitry 86 on a printed circuit board 88 which is mounted in the center of a partition member 90 supported in the upper end of the housing 12. The circuitry 86 may comprise any suitable bridge type measuring arrangement which is in turn connected to the connector 14 through the wires 92.

If desired a stop member may be provided for limiting upward travel of the beam 64 so as to permit the device to be subjected to overloading. More particularly, the beam structure 34 may be provided with tapped holes in the upper surface thereof which receive mounting screws for a stop member the central portion of which extends through the central opening in the board 84 and engages the upper end of the portion 46 when the diaphragm 24 is subjected to an overload.

Preferably, the slots 56 and 58 are formed by means of an electron discharge milling operation so that the flexure elements 70, 72 may be extremely thin, in the order of 0.010 inch, and may be torsionally flexed quite easily while providing a suspension for the beam 64 which will withstand substantial force exerted on the center of the beam from the diaphragm 24 through the stem portion 48. In this connection it will be noted that the end portions 60 and 62 of the beam 64 are relatively massive, as are the central stem portions 46 and 48, and do not bend appreciably thus forcing maximum bending in the areas 78 and 80 in which the strain gauges 82 are placed, as best illustrated in FIG. 7. It will also be noted that the beam 64 is supported only at diametrically opposed corners 66, 68 so that a symmetrical mounting is provided in which the beam floats on the ends of the flexure elements 70, 72 and the other corners 65, 67 of the beam 64 are unrestrained. Accordingly, the beam suspension of the present invention lessens the effects of so-called membrane forces common to beams which are fixed at both ends and results in a more uniform change in strain per unit of deflection. As a result, the beam 64 may be deflected to substantially higher strain levels without introducing nonlinearities or second order distortions. For example, it has been found that a beam structure constructed as shown in the drawings can be operated at strain levels as high as 2400 microinches per inch and still maintain linear strain variations.

In assembling the diaphragm 24 with the beam structure 34 it is important to provide a direct positive connection between these members so that the hysteresis effect encountered with relatively movable parts is avoided. At the same time it is desirable to connect these members in a strain free manner so that stresses are not set up in either the beam or the diaphram which will introduce nonlinearities when the diaphragm is flexed and the beam is deflected. To this end, the stem portion 48 of the beam structure 34 is first secured to the sleeve portion 32 of the diaphragm by a suitable welding or brazing operation, as indicated at 96 in FIG. 2. The bottom edge of the outer rim portion 28 of the diaphragm 24 is then secured to the upper edge of a rim portion 100 of the fitting 16, as indicated at 102 by means of a suitable welding operation. Since the weld 102 forms a pressure boundary it must necessarily be a very deep weld during which the rim portion 28 of the diaphragm tends to warp. However, since the outer rim portion 38 of the beam structure 34 is not yet connected to the rim 28 such warpage does not stress the beam 64. After the weld 102 has been made, a large weld 98 is made between the outer rim portion 38 of the beam structure 34 and the upper edge of the diaphragm rim 28 to form an integral diaphragm-beam assembly.

While the above-described method of assembly is effective to eliminate major nonlinearities due to warpage of the rim 28, there is always a slight amount of warpage to contend with. In accordance with a preferred embodiment of the invention, the fitting 18 is connected to a pressure fluid supply and adjustable stops of a suitable alignment fixture are positioned in engagement with the upper surface 35 of the beam structure 34 before the weld 98 is made. The strain gauges 82 are then hooked up and these stop members are adjusted to position the beam 64 to give zero electrical output. Pressure is then applied to the diaphragm 24 over a desired range of pressures and the linearity of the response curve of the diaphragm-beam assembly is obtained. The stop members may now be adjusted to position the beam for an optimum range of travel of the diaphragm 24 to provide minimum nonlinearity of the overall response curve and then the weld 98 is made. Such an assembly procedure is made possible due to the fact that the flexure mounting elements 70, 72 provide a mounting arrangement for the beam 64 resulting in an output signal which is linear to 0.01% over a range of travel of approximately 0.003 inch and hence the optimum position of the diaphragm 24 with respect to the beam structure 34 may be selected in the manner described above.

The housing 12 is then placed over the assembled transducer unit and is secured to the fitting 16, as indicated at 104. As assembled, the diaphragm 24 is positioned relative to the fitting 16 so as to define a chamber 106 that communicates with the fluid supply by way of inlet 18 and opening 108. Fitting 16 further includes duct 110 communicating at one end with the inlet 18 and at the other end with chamber 106. Duct 110 functions as a cleaning duct and allows fluid to return to the inlet 18 from the chamber 106 when a smaller tube is inserted into the opening 108 and cleaning fluid under pressure is supplied to the chamber 106 through this tube, thereby permitting the surface of the diaphragm 24 which is exposed to the pressure fluid to be cleaned periodically without disassembling the transducer.

Fitting 16 further includes a circumferential slot 112 that isolates the diaphragm assembly 22 from threaded inlet 18 and housing 12 and thus from the mounting torque resulting upon attachment of transducer 10 to a fluid pressure line.

In operation, fitting 16 is connected to a fluid supply allowing pressurized fluid to pass through inlet 18 and flow into chamber 106, whereupon the pressurized fluid acts against diaphragm 24. Diaphragm 24 functions as a summation device and transmits the forces exerted by the pressurized fluid to the center of the beam 64 through the stem 48. When this occurs the central portion of the beam 64 is moved upwardly, as shown in greatly expanded form in FIG. 7, and the beam is bent in the areas 78 and 80 so as to actuate the gauges 82 and provide a change in the resistance thereof which is proportional to deflection of the beam in these areas. As the central portion of the beam is moved upwardly the outer corners 66, 68 of the beam 64 are free to move inwardly since they are connected to the fixed support 34 through the thin flexure elements 70, 72 as shown in FIG. 6, it being noted that FIG. 6 is a perspective view of the beam as viewed from the bottom so that force is applied downwardly to the center of the beam 64 in FIG. 7. Thus, as viewed in FIG. 7 the end of the flexure element 70 which is connected to the beam at 66 moves inwardly and downwardly causing a very slight twisting of the flexure mounting element 70. With this arrangement the beam is free to assume the position required while maintaining the central stem portion thereof aligned with the center of the diaphragm 24 so that nonlinearities are not introduced even though the beam is deflected over a wide range of displacements.

It should also be noted that the beam structure 34 may be employed with diaphragms of different diameters to accommodate different pressure ranges. Thus, if a higher pressure range is required, the diameter of the diaphragm 24 may be smaller so that the area exposed to the input pressure is reduced.

While the beam structure 34 has been described in detail in connection with a pressure transducer, this highly linear beam structure may also be used in other force measuring applications. For example, in FIG. 8 the beam structure is shown in conjunction with an accelerometer or load cell measuring arrangement. In this embodiment a weight indicated diagrammatically at 120 in FIG. 8 is secured to the upper end of the central stem portion 46 of the beam structure 34, the outer rim portion 38 thereof being secured to a suitable supporting member indicated generally at 122. The mass 120 may be arranged so that acceleration of the support 122 is measured by the output signal developed from the strain gauges 82. In the alternative, the weight 120 may comprise any suitable load cell arrangement so that the strain gauge output signal measures the desired weight of an object, as will be readily understood by those skilled in the art.

While there have been illustrated and described preferred embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A unitary force measuring beam assembly comprising,
   a fixed beam support member,
   a deflectable beam,
   means for applying a force to be measured to the center of said beam,
   and means for symmetrically and floatingly mounting said beam to said beam support member, said last named means comprising a pair of torsionally flexible mounting elements connected between the opposite ends of said beam and said beam support member and extending in planes perpendicular to the plane of said beam.

2. A unitary force measuring beam assembly comprising,
   a fixed beam support member,
   a deflectable beam,
   means for applying a force to be measured to the center of said beam,
   and means for symmetrically and floatingly mounting said beam to said beam support member, and last named means comprising a pair of torsionally flexible mounting elements connected between the opposite ends of said beam and said beam support member and extending in planes perpendicular to the plane of said beam,
   said mounting elements being connected to diametrically opposite corners of said beam.

3. The combination of claim 2, wherein said mounting elements extend parallel to and spaced from the ends of said beam.

4. In a strain gauge pressure transducer, the combination of, a pressure chamber defining housing including a diaphragm in one wall thereof,
   a rigid beam support member positioned adjacent said diaphragm and concentric therewith,
   a deflectable beam rigidly connected to the center of said diaphragm, and means for symmetrically and floatingly mounting said beam to said beam support member, said last named means consisting solely of a pair of torsionally flexible mounting elements connected between the opposite ends of said beam and said beam support member and extending in planes perpendicular to the plane of said diaphragm.

5. The combination of claim 4, wherein said beam includes a central stem portion rigidly connected to the center of said diaphragm and relatively thick end portions to which said mounting elements are connected.

6. The combination of claim 5, wherein said beam also includes relatively thin, narrow portions intermediate said stem portion and said end portions, and strain gauge measuring elements secured to said intermediate portions.

7. The combination of claim 1, wherein said diaphragm inlcudes a central sleeve portion, and said beam includes a central stem portion positioned within said sleeve portion and rigidly secured thereto.

8. A unitary force measuring beam assembly comprising,
 a fixed beam support member,
 a deflectable beam,
 means for applying a force to be measured to the center of said beam,
 and means for symmetrically and floatingly mounting said beam to said beam support member, said last named means comprising a pair of torsionally flexible mounting elements connected between the opposite ends of said beam and said beam support member and extending in planes perpendicular to the plane of said beam,
 said mounting elements have a thickness in the order of 0.01 inch.

* * * * *